April 6, 1954    M. D. HILES    2,674,426
FISHING ROD HOLDER WITH FOLDING PROP
Filed July 12, 1951

Milburn D. Hiles
INVENTOR.

BY *Clarence A. O'Brien*
*and Harvey B. Jacobson*
Attorneys

Patented Apr. 6, 1954

2,674,426

UNITED STATES PATENT OFFICE 2,674,426

FISHING ROD HOLDER WITH FOLDING PROP

Milburn D. Hiles, Flint, Mich.

Application July 12, 1951, Serial No. 236,347

2 Claims. (Cl. 248—38)

The present invention relates to certain new and useful improvements in fishing rod holding and supporting devices and has reference, more in particular, to a construction which is characterized by a base which is removably attachable to a relatively fixed support and novel means carried by said base and adapted to detachably support a fishing rod in an inclined readily accessible position.

As the preceding statement reveals, mechanical fishing pole and rod holders for use on shore, on the gunnel of a boat and on a wharf or the like are old and well known. Those engaged in this line of endeavor are conversant with the fact that is is common practice to prop a fishing rod in a properly angled or inclined position by way of mechanical holding means, that it is then customary, when a strike is made, to slip the handle of the fishing rod out of the holder and to manually angle the rod according to various approved practices. With a view toward better fulfilling the requirements of those who approve and who have used mechanical fishing rod holders, it is the object of the present invention to structurally, functionally and otherwise improve upon known prior art holders and, in so doing, to more aptly fulfill the requirements and needs of manufacturers and users alike.

More particularly stated, another object of the invention is to provide a rod holder which embodies a base having apertured means, whereby same may be selectively staked on the riverbank or shore or may be optionally screwed or otherwise fastened on a wharf or gunnel of a fishing boat.

Another object of the invention has to do with a construction as stated, wherein the base is provided with a simple hingedly mounted panel, the latter constituting an upright and holder for the handle of the rod, having an angularly disposed hole for the handle and having an oblique angled end which abuts the base so that the fishing rod, which then functions as an incumbent weight, is propped up in the desired, inclined, self-sustained fishing position.

A still further object of the invention is to provide a hingedly mounted folding upright or panel which, in addition to having a hole to accommodate the handle of the fishing rod, also has a longitudinal open ended bore which serves as a receiving socket for the shank of the anchoring stake, said stake and base being provided with co-acting screw-eyes which may be interconnected by a safety pin or the like for purposes of retaining the stake on the panel.

Other objects and advantages will become more readily apparent from the following description and the accompanying sheet of illustrative drawings.

In the accompanying sheet of drawings wherein like numerals are employed to designate like parts throughout the views.

Figure 1:
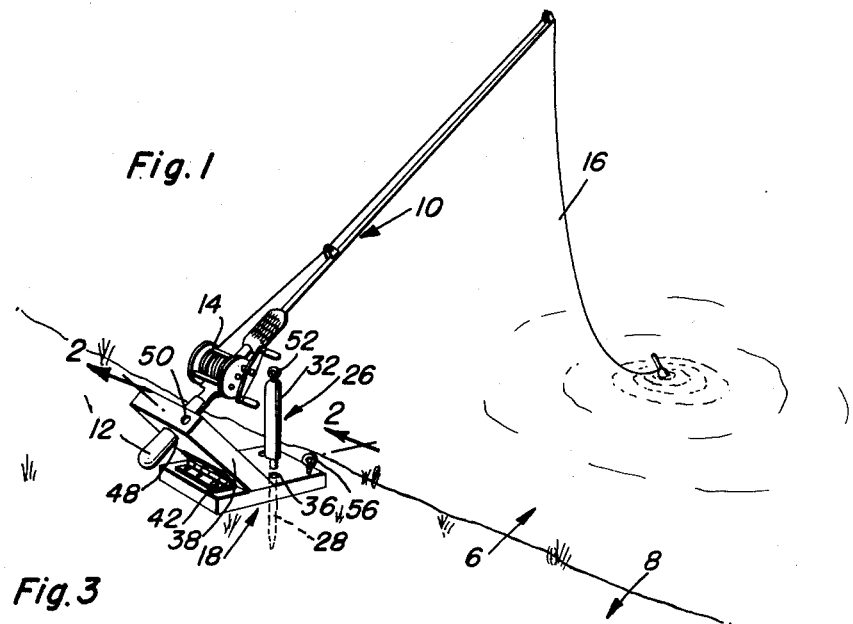
Figure 1 is a perspective view of a fishing rod holder constructed in accordance with the principles of the invention and showing the manner in which the same is staked on a bank and used.

Referring now to the drawings by way of reference numerals and accompanying lead lines, the river or other body of water is denoted by the numeral 6 in Figure 1 and the shore or bank by the numeral 8. The fishing rod is denoted at 10 and includes a handle portion 12, a reel 14 and fishing line 16. Of course, these are components of the view to illustrate the general assemblage and mode of use of the improved fishing rod holder.

Figure 3:
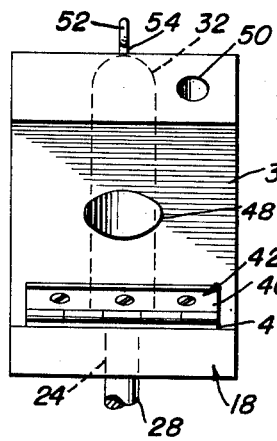
Figure 3 is an end elevational view observing the construction shown in Figure 1 in a direction from left to right.
Figure 2:
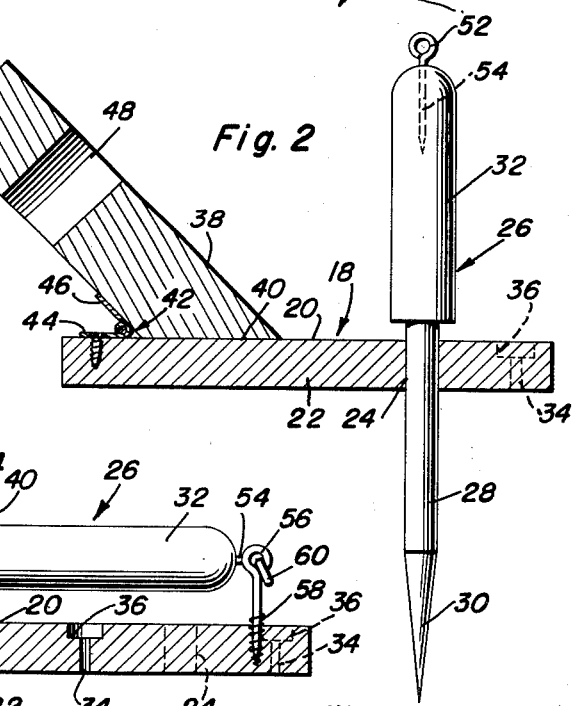
Figure 2 is a sectional view taken on the plane of a line 2—2 of Figure 1, looking in the direction of the arrows, said view being on an enlarged scale and the anchoring stake appearing in elevation.
Figure 4:
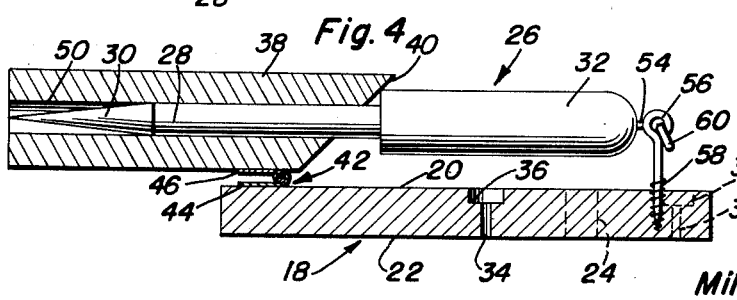
Figure 4 is a view showing the holder with the prop folded and the stake removably attached thereto and held against displacement.

The details of construction are best illustrated in Figures 2 to 4. The aforementioned base is denoted by the numeral 18 and comprises a wooden or equivalent rectangular block having top and bottom surfaces 20 and 22 which are flat. There is a vertical hole 24 through the base which is to accommodate the insertable and removable ground anchoring stake 26. The latter comprises a reduced shank portion 28 with a pointed lower end 30 and an enlarged handgrip 32. The shank is adapted to pass through the hole 24 to be anchored in the ground. The base also has other smaller holes and these are selectively usable and are denoted by the numerals 34 having their upper ends counter-sunk at 36. These are adapted to accommodate suitable headed screws or fasteners, in a manner to be hereinafter referred to. The folding prop, also broadly referred to as upright means, comprises a rectangular wooden or equivalent panel 38. This is of a width corresponding to the width of the base and it has a mitered lower end 40, generally on a 45° angle, which abuts and firmly rests against the top of the base when the panel is in its rod supporting position. The panel is joined to the base by way of a butt hinge 42 having one leaf 44 fastened to the base and the other leaf 46 fastened to the coacting surface of the panel. The position and arrangement of the hinge means allows the panel to assume the prop forming position shown in Figures 1 to 3, inclusive, and also allows the panel to be folded down to carrying or transporting position as shown in Figure 4 where it is substantially parallel with but in a plane above the base. The panel has opening means therein which takes the form of a simple hole or passage 48. This is adapted to snugly accommodate the handle 12 of the fishing rod. The hole 48, while at right angles to the longitudinal axis of the panel, takes an oblique-angled position when the panel or prop is in its "up" position as shown in Figures 1 to 3 and this is the correct position, it has been established, for angling the fishing rod into its fishing position. The panel is also provided with a lengthwise bore which opens through opposite ends of the panel, said bore being denoted at 50 and functioning as an accommodation scabbard. That is to say, when the device is not in use and is folded up as shown in Figure 4, the pointed shank of the stake 26 is telescoped into this so-called scabbard and the handle portion is allowed to project and to overlie the base. In this connection, it will be observed that the handle has an axial eye-screw 52, whose shank is screwed into the handle 32 in the manner shown at 54 in Figure 2. This eye-screw is adapted to register with the complemental eye 56 of the second eye-screw 58 which is threaded into the base as shown in Figures 1 and 4. By using a link or tie, such as a safety-pin or the like 60, the two eye-screws may be fastened together. Obviously, this thus temporarily fastens the pointed shank in the bore or scabbard 50.

It is to be pointed out that these same eye-screws may be handily employed by passing them through the holes 34 in the base when it is desired, for example, to mount the base on a wharf or the wall or gunnel of a fishing boat. Thus, the eye-screws are interchangeable in purpose.

Considering the pitch or angle of the foldable panel 38 in relation to the horizontal base, as shown in Figure 1, and with the fishing rod in the hole 48, the rod becomes an incumbent weight and overcomes the center of gravity of the panel or prop and thus holds the latter in its rod erecting position.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. A folding fishing rod holder comprising a base block having at least one hole therethrough, a ground anchoring stake embodying a handle portion and a shank portion, said shank portion being adapted to extend through said hole for purposes of staking the base on a shore bank or the like, a rod holding and propping panel, means hingedly connecting one end of said panel with said base, said panel having a hole therethrough to receive and support a handle portion of a fishing rod, said panel portion also having a longitudinal bore cooperating with said panel in providing a sheath to accommodate the shank of said stake fitting removably in said sheath, an eye-screw removably mounted in said base and rising from the base, a second eye-screw removably mounted axially in and projecting from one end of the handle of the stake, and means separably connecting the respective eye-screws with one another.

2. A fishing rod holder and support comprising a horizontal base block having flat top and bottom surfaces, means cooperable with said block for securing same to a relatively fixed foundation, an inclined folding panel having a mitered lower end resting firmly atop said top surface, said panel thus providing a long surface on one side and a short surface on the opposite side, and a butt hinge having its complemental leaves fastened one to said top surface and the other fastened to the short surface of said panel, said panel having a hole therethrough, the axis of said hole being oblique to the horizontal plane of said block and at right angles to the longitudinal axis of said panel, said panel being adapted to assume a folded position when not in use and a position tilted in respect to the plane of said base when in use and said hole being adapted to permit the passage of the handle of a rod therethrough, whereby the rod, then functioning as an incumbent weight, is propped up in an inclined self-sustained fishing as well as ready-to-remove position.

References Cited in the file of this patent

UNITED STATES PATENTS

| Number | Name | Date |
|---|---|---|
| 619,517 | Trammel | Feb. 14, 1899 |
| 846,222 | Makepeace | Mar. 5, 1907 |
| 1,999,925 | Buzhardt | Apr. 30, 1935 |
| 2,448,752 | Wagner | Sept. 7, 1948 |